United States Patent Office 3,825,605
Patented July 23, 1974

---

3,825,605
OXIDATION OF ISOPARAFFINS TO TERTIARY ALCOHOLS
Byron E. Johnston, Califon, N.J., assignor to Mobil Oil Corporation
No Drawing. Filed Aug. 2, 1971, Ser. No. 168,429
Int. Cl. C07c 27/12, 31/12
U.S. Cl. 260—632 C    7 Claims

ABSTRACT OF THE DISCLOSURE

A process for effecting the liquid phase oxidation of an isoparaffin, such as isobutane, to the corresponding tertiary alcohol. The reaction is conducted in the presence of a catalyst having the following formula:

$$M_{m/n}M'_xM''_yO_w$$

wherein M is cobalt or chromium, M' is selected from the group consisting of cobalt, manganese, iron, chromium and aluminum, M'' is molybdenum or tungsten, $w$ represents the number of oxygen atoms and $m$ and $n$ represents the charge on the anion and cation respectively from which the catalyst is derived and will be described hereinafter. These catalysts may be employed with a suitable support such as alumina.

BACKGROUND OF THE INVENTION

Field of the Invention

This invention relates to the oxidation of isoparaffin hydrocarbons. More particularly, this invention deals with the liquid phase oxidation of isoparaffins to tertiary alcohols with the use of a specified molybdenum or tungsten containing catalyst.

Description of the Prior Art

It is well known that isobutane may be oxidized by thermal methods to produce tertiary butyl alcohol and tertiary butylhydroperoxide with minor amounts of acetone and di-tertiary butylperoxide. It is also known that certain metal salts such as cobalt (II) octoate may be used to increase the over all rate of vapor phase oxidation of isobutanes to tertiary butyl alcohol. Additionally, some cobalt-molybdenum alumina catalysts have been used as vapor phase oxidation catalysts. However, in the vapor phase, the production of isobutylene, rather than t-butyl alcohol, is difficult to avoid. With the use of the particular catalyst described herein, it has been found that the oxidation of an isoparaffin can be effectively carried out in the liquid phase.

SUMMARY OF THE INVENTION

In accordance with this invention, a method is provided for the oxidation of isoparaffins to tertiary alcohols by contact with a catalyst having the following formula:

$$M_{m/n}M'_xM''_yO_w$$

wherein M is cobalt or chromium, M' is selected from the group consisting of cobalt, manganese, iron, chromium, aluminum, M'' is molybdenum or tungsten, $w$ represents the number of oxygen atoms and $m$ and $n$ represents the charge on the anion and cation respectively from which the catalyst is derived and will be described hereinafter. The reaction is carried out at between about 50° and about 200° C. and at pressures at least sufficient to maintain the reactants in the liquid phase. The catalyst is a solid oxide catalyst and is preferably a catalyst of the type known as a multimetalite.

DESCRIPTION OF THE SPECIFIC EMBODIMENTS

Multimetalites are synthesized by the thermal decomposition of the following type of compound:

$$[ML_N]_{m/n}[M'_xM''_yO_z]$$

where

M = a transition metal or a mixture of a transition metal with hydrogen
N = the number of ligands
L = a set of N ligands at least one of which functions as a reducing agent
$m$ = the charge of the anion
$n$ = the charge of the cation
M' = a transition metal or non-metal or hydrogen
M'' = selected from the group consisting of Group VB and VIB metals
$x$ is 1 or 2
$y$ is between 5 and 20
$z$ is between 20 and 50.

Multimetalites can be represented by the following formula:

$$M_{m/n}M'_xM''_yO_w$$

wherein M is derived from the cation of a compound of the above type wherein said cation is hydrogen, or a transition metal or mixture thereof with each other, M' is a metal or a non-metal or M'' is derived from the metal which is represented by M'' in the parent compound and $w$ is a number representing the number of oxygen atoms and is less than $z$ noted hereinbefore. Generally at leat two of M, M' and M'' differ from one another. For purposes of illustration the products of the thermal decomposition of the compound:

$$[Co(NH_3)_6][MMo_6O_{24}H_6]xH_2O$$

where M=Co, Fe, Cr and Al should be written as follows:

$$CoCoMo_6O_{19}$$
$$CoFeMo_6O_{19}$$
$$CoCrMo_6O_{19}$$
$$CoAlMo_6O_{19}$$

For the purposes of this invention, the multimetalite catalyst may be employed with a suitable support or binder which is thermally stable under the conditions at which the oxidation is carried out, and generally is inert to reactants in the oxidation reaction embodied herein. Contemplated for such use are any of various solid adsorbents, carriers and supports. Non-limiting examples of such supports are binder materials including dried inorganic oxide gels and gelatinous precipitates of alumina, silica, zirconia, magnesia, thoria, titania, boria and compositions of these oxides with one another. Further non-limiting examples of suitable supports include activated charcoal, mullite, bauxite, silicon carbide, sintered alumina and various clays.

The concentration of the catalyst that is used in this invention varies over a wide range. However, amounts from about 0.1% to about 30% by weight of isoparaffin hydrocarbon reactant is generally used. Amounts from about 1% to about 20% by weight of isoparaffin hydrocarbon are preferable.

The oxidation reaction encompassed by this invention is carried out at an elevated temperature and in combination with a pressure sufficient to maintain a liquid phase reaction. Preferred conditions include temperatures of about 50° C. to about 200° C. and, more preferably, about 100° C. to about 150° C. A pressure of about subatmospheric to about 1500 p.s.i.g. is preferred and more preferable is a range of about 100 p.s.i.g. to about 1000 p.s.i.g.

A preferred embodiment of this invention is the oxidation of isobutane to tertiary butanol, a material useful as an additive for improving the octane number of gasolines. This process is also useful for the oxidation of other isoparaffins having a carbon content ranging from 4 to 6 produce the corresponding tertiary alcohols. Examples of such other isoparaffins include isopentane and isohexane.

A preferred embodiment of this invention is to employ an oxygen reactant in order to facilitate the formation of tertiary alcohols. The oxygen reactant can be relatively pure oxygen or a gaseous mixture containing free oxygen, e.g., air. The amount of oxygen for use in this invention is at least stoichiometric amount necessary for reaction, or preferably an amount in excess of that stoichiometric required.

The reaction of this invention may be carried out in either a batch or continuous process. In a continuous operation the product alcohol may be separated from the reaction mixture by conventional means and the remainder of the reaction mixture may be recycled. Additionally, the multimetalite should be treated with a reducing atmosphere such as hydrogen, carbon monoxide, ammonia and the like before using.

The following examples will illustrate the fact that a multimetalite catalyst exhibits isoparaffin oxidation activity which is significantly superior to that obtained when commercial cobalt molybdate on alumina is employed.

EXAMPLE 1

Alumina (25 g.) was treated with an aqueous solution of $(NH_4)_3CoMo_6O_{26}H_6 \cdot 7H_2O$ (5 g. in 100 cc.). After stirring two hours the alumina was recovered by filtration and dried at 100° C. overnight. Analysis: 1.0% CoO, 9.26% $MoO_3$.

EXAMPLE 2

A cobalt heteropoly $Co(NH_3)_6CoMo_6O_{26}H_6 \cdot 7H_2O$ was decomposed slowly at 540° C. under vacuum to obtain a multimetalite of formula $CoCoMo_6O_{19}$. This material was ball milled with alumina (10% $CoCoMoO_{19}$, 90% $Al_2O_3$). The resulting catalyst was treated prior to reaction with hydrogen at 1,000° F. for four hours. Analysis: 2.9% CoO, 2.8% $MoO_3$.

EXAMPLES 3–9

Table I summarizes the conversion and product distribution data for thermal and catalyzed liquid phase air oxidation of isobutane performed batchwise at 600 p.s.i.g. in a stirred autoclave of 300 cc. capacity. Maximum oxidation rates were obtained with the cobalt oxide catalysts, and in particular the $CoCoMo_6O_{19}$-$Al_2O_3$ catalyst. Catalyst A was 0.3 weight percent of isobutane reactant. Catalysts B and C were 19 weight percent of isobutane reactant. Catalysts D, E and F were 6 weight percent of isobutane reactant.

TABLE I

|  | Thermal | Catalyst | | | | | |
|---|---|---|---|---|---|---|---|
|  |  | A | B | C | D | E | F |
| Induction Period [a] | 100 | 10 | 25 | 25 | 0 | 0 | 150 |
| Percent: |  |  |  |  |  |  |  |
| Conversion [b] | 19 | 22 | 35 | 35 | 39 | 41 | 49 |
| t-Butanol | 10 | 14 | 26 | 25 | 29 | 30 | 35 |
| t-Butylhydroperoxide | 8 | 2 | 3 | 3 | 2 | 1 | 1 |
| Acetone | 1 | 7 | 6 | 7 | 8 | 10 | 12 |
| Di-t-butylperoxide | 1 | 1 | 1 | 1 | 1 | 1 | 1 |

[a] Time until oxygen uptake is observed.
[b] Conversion of isobutane at 250 min. beyond initial oxygen uptake. Conditions were 600 p.s.i.g., 125° C., 0.6 wt. percent di-t-butylperoxide added as initiator. Numbers are in mole percent. Air flow at 240 ml./min. measured at 1 atm.

NOTE.—Catalyst A=Cobalt octoate. Catalyst B=Cobalt oxide. Catalyst C=Cobalt oxide (10% by wt.) on alumina. Catalyst D=Cobalt molybdate (12% by wt.) on alumina. Catalyst E=Cobalt molybdenum heteropoly on alumina (Example 1). Catalyst F=Cobalt molybdenum multimetalite-alumina (Example 2).

EXAMPLES 10–17

Multimetalites deposited on alumina and represented by catalysts G, H, I, J, K, L and M were synthesized by the method of Example 2 from their corresponding heteropoly salts as illustrated in Table II.

TABLE II

| Catalyst | | | |
|---|---|---|---|
| G | $Co_2MnMo_9O_w$ [1] | from | $[Co(NH_3)_6]_2 [MnMo_9O_{32}]$ |
| H | $CoFeMo_6O_{19}$ | from | $[Co(NH_3)_6] [FeMo_6O_{24}H_6]$ |
| I | $CoCoMo_6O_{19}$ | from | $[Co(NH_3)_6] [CoMo_6O_{24}H_6]$ |
| J | $CoCrMo_6O_{19}$ | from | $[Co(NH_3)_6] [CrMo_6O_{24}H_6]$ |
| K | $CrCoMo_6O_{19}$ | from | $[Cr(NH_3)_6] [CoMo_6O_{24}H_6]$ |
| L | $Co_2CoW_{12}O_{37}$ | from | $[Co(NH_3)_6]_2 [Co^{II}W_{12}O_{40}]$ |
| M | $CrCrMo_6O_{19}$ | from | $[Cr(NH_3)_6] [CrMo_6O_{24}H_6]$ |

[1] w=the number of oxygen atoms.

EXAMPLES 18–25

The following examples, as illustrated in Table III, demonstrate the ability of various multimetalites deposited on alumina to oxidize isobutane to t-butyl alcohol at an effective conversion rate.

TABLE III

|  | Thermal | Catalyst | | | | | | |
|---|---|---|---|---|---|---|---|---|
|  |  | G* | H | I | J | K* | L | M |
| Induction period, mins. [a] | 50 | 105 | 15 | 0 | 80 | 160 | 0 | 40 |
| Conversion, [b] percent | 17.5 | 39 | 31 | 36 | 37.5 | 38 | 29.5 | 26 |
| Mole percent: |  |  |  |  |  |  |  |  |
| t-Butyl alcohol | 9.5 | 32 | 23 | 29 | 30 | 30 | 23.5 | 20 |
| t-Butylhydroperoxide | 7.5 | 2 | 3 | 1.7 | 1.5 | 1 | 3.5 | 2 |
| Acetone | 0.3 | 5 | 4 | 5 | 5.5 | 6 | 2 | 4 |
| Di-t-butylperoxide | 0.3 | <1 | 1 | 0.3 | 0.5 | 1 | 0.5 | 0.5 |

[a] Time until oxygen uptake is observed.
[b] Conversion of isobutane at 250 min. beyond initial oxygen uptake. Conditions were 600 p.s.i.g., 116-7 ° C·, 500 ml./min. air flow. Each experiment contained 84 gms. of isobutane, 0.5 gm. of di-t-butylperoxide (initiator), and 5 gms. of catalyst.
*Extrapolated data.

NOTE.—Catalyst G=10% $Co_2MnMo_9O_w$/90% on alumina. Catalyst H=10% $CoFeMo_6O_{19}$/90% on alumina. Catalyst I=10% $CoCoMo_6O_{19}$/90% on alumina. Catalyst J=10% $CoCrMo_6O_{19}$/90% on alumina. Catalyst K=10% $CrCoMo_6O_{19}$/90% on alumina. Catalyst L=10% $Co_2CoW_{12}O_{37}$/90% on alumina. Catalyst M=10% $CrCrMo_6O_{19}$/90% on alumina.

What is claimed is:

1. A process for effecting the oxidation in a liquid phase of an isoparaffin to a tertiary alcohol by contacting an isoparaffin having from 4 to 6 carbon atoms, in the presence of an oxygen-containing gas, at a pressure sufficient to maintain the reactant in the liquid phase; and at a temperature of about 50° C. to about 200° C. with a catalyst which has been pretreated with a reducing agent, said catalyst being selected from the group consisting of $CoFeMo_6O_{19}$, $CoCoMo_6O_{19}$, $CoCrMo_6O_{19}$, $CrCoMo_6O_{19}$, $CrCrMo_6O_{19}$, $CoAlMo_6O_{19}$ and $Co_2CoW_{12}O_{37}$; said catalyst being pretreated with a reducing atmosphere selected from the group consisting of hydrogen, carbon monoxide and ammonia.

2. A process according to Claim 1 wherein the catalyst is supported on alumina.

3. A process according to Claim 1 wherein the catalyst is $CoCoMo_6O_{19}$.

4. A process according to Claim 1 wherein the isoparaffin is isobutane.

5. A process according to Claim 1 wherein the catalyst is present in an amount from about 0.1 to about 30 weight percent of said isoparaffin hydrocarbon reactant.

6. A process according to Claim 1 wherein the reducing atmosphere is hydrogen.

7. A process according to Claim 1 wherein the pressure is about 100 p.s.i.g. to about 1000 p.s.i.g.

References Cited

UNITED STATES PATENTS

| | | | |
|---|---|---|---|
| 2,410,642 | 11/1946 | Farkas et al. | 260—632 C |
| 3,529,020 | 9/1970 | Landis | 260—632 C |
| 3,275,680 | 9/1966 | Halzrichter et al. | 260—632 C |
| 3,505,360 | 4/1970 | Allison et al. | 260—632 C |
| 3,391,214 | 7/1968 | Fetterly | 260—632 C |
| 3,752,776 | 8/1973 | Chester et al. | 260—470 |

JOSEPH E. EVANS, Primary Examiner

U.S. Cl. X.R.

252—465, 467, 470; 260—604 R, 610 B